Oct. 28, 1952 J. SISHC 2,615,295
BEAN HARVESTER
Filed March 10, 1949 3 Sheets-Sheet 3
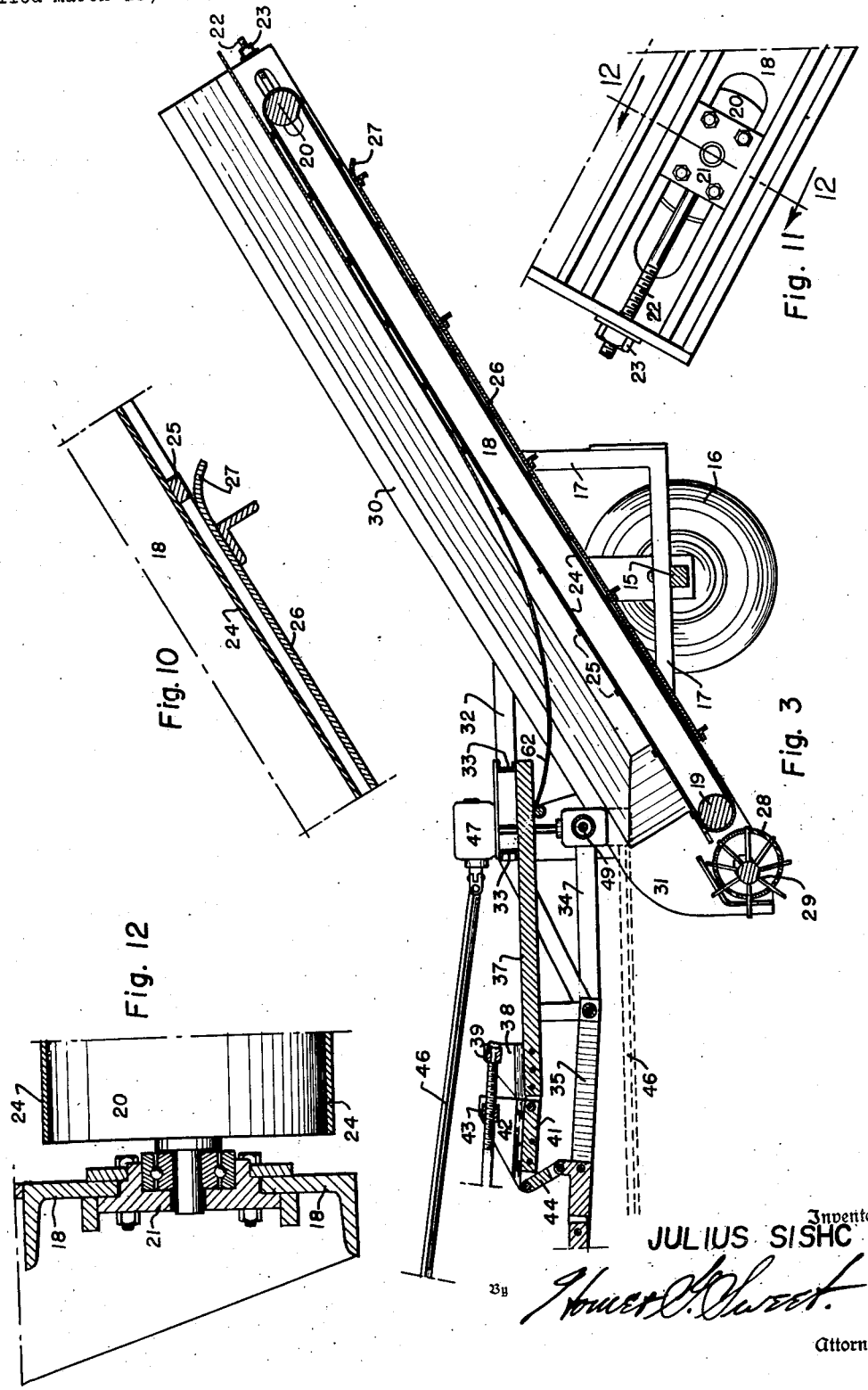
Inventor
JULIUS SISHC
By Homer C. Sweet
Attorney Patented Oct. 28, 1952

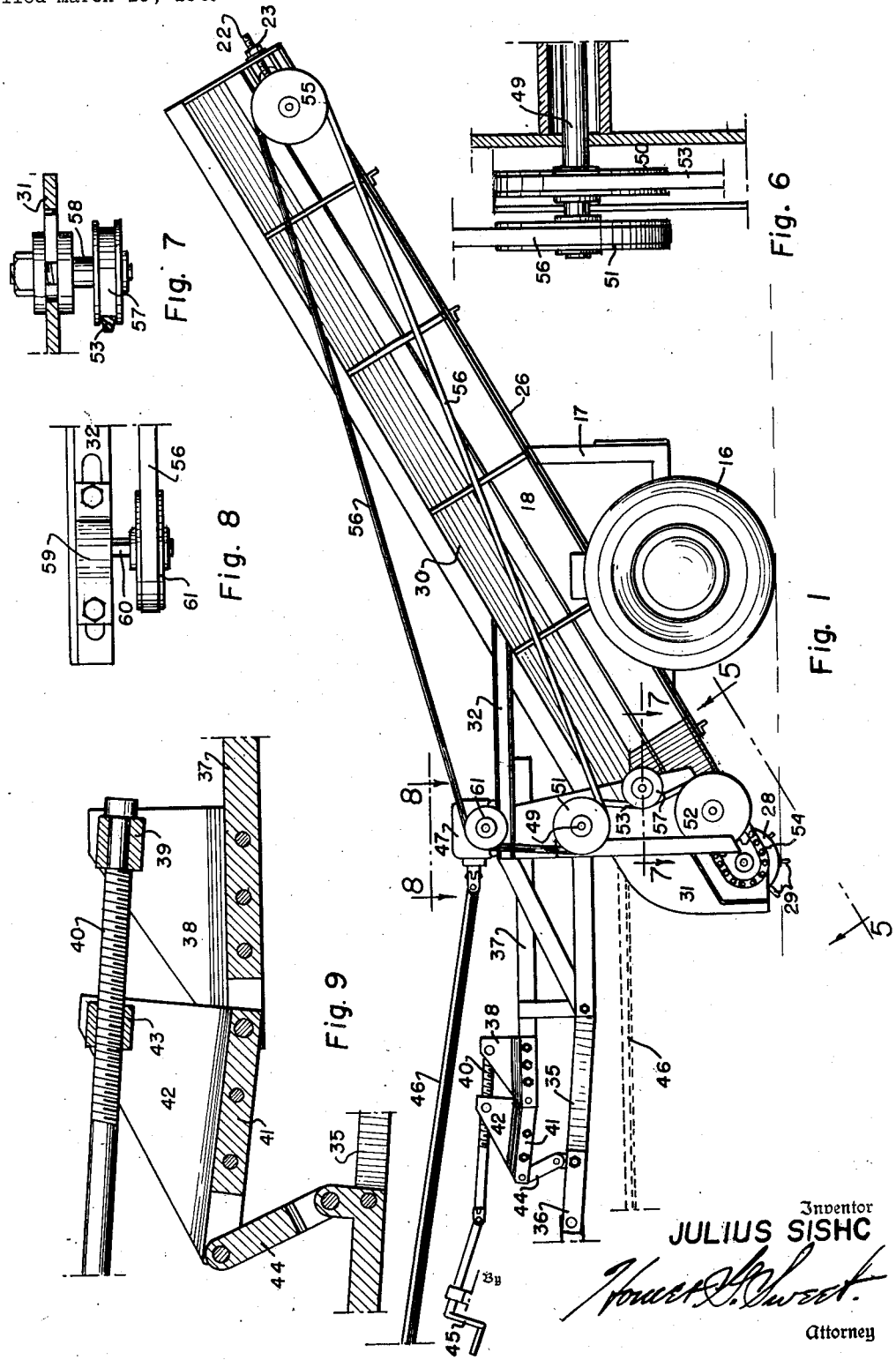

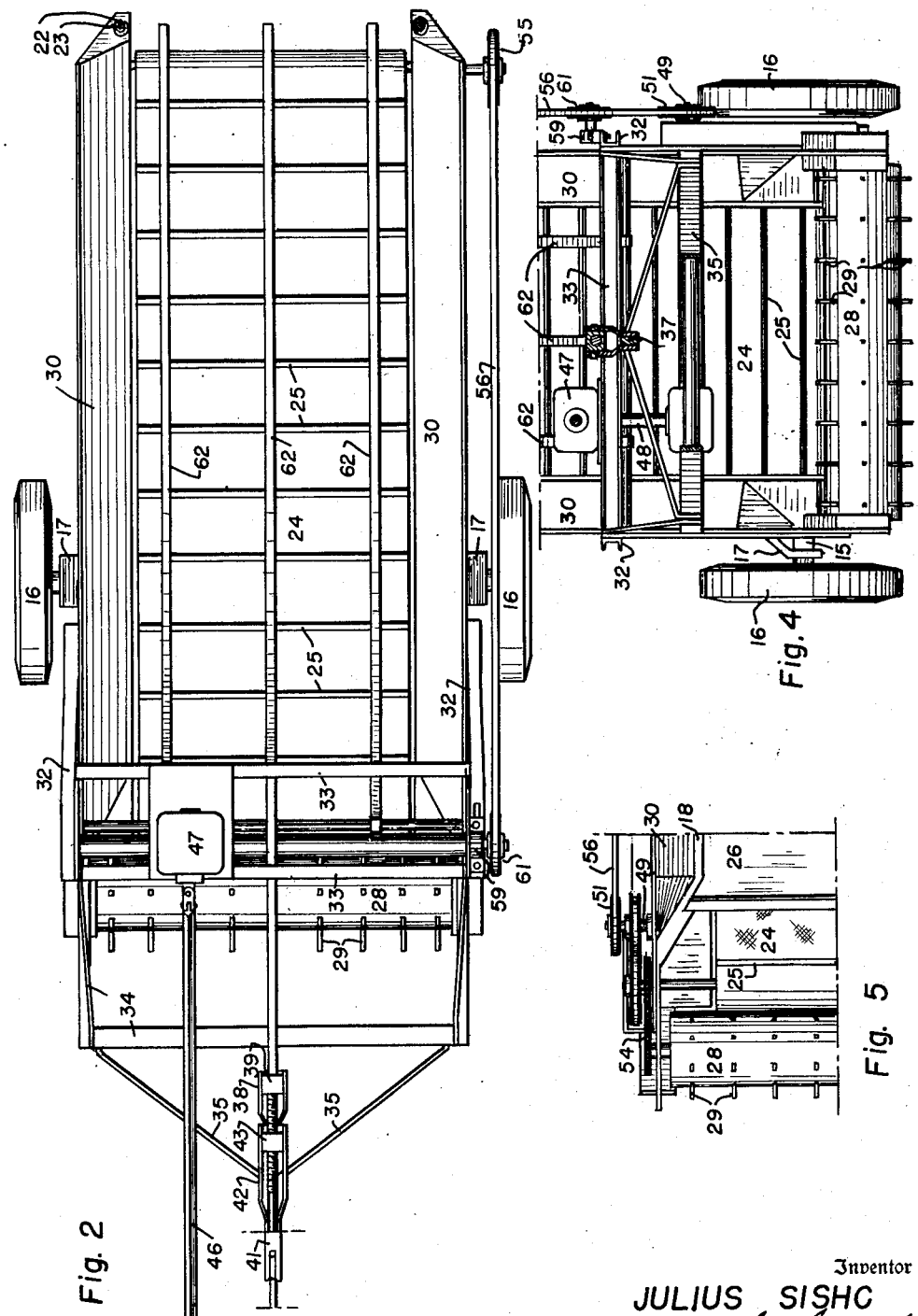

2,615,295

UNITED STATES PATENT OFFICE 2,615,295

BEAN HARVESTER

Julius Sishc, Torrington, Wyo.

Application March 10, 1949, Serial No. 80,640

1 Claim. (Cl. 56—218)

This invention relates to crop-harvesting equipment, and more particularly to an implement adapted for operative association with a conventional powered tractor to gather and collect beans and analogous vine crops from their positions of field growth and to deliver the so-gathered crop to conveyors wherein it may be transported away from the field, and has as an object to provide an improved operative combination of elements constituting such an improved tractor-powered implement for the harvesting of beans and analogous vine crops with expedition and a minimum of loss.

A further object of the invention is to provide an improved construction and interassociation of elements constituting a vine crop harvester susceptible of operative association with a conventional tractor.

A further object of the invention is to provide improved means for operatively associating a vine crop harvester with a conventional tractor.

A further object of the invention is to provide improved, selectively adjustable means for operatively coupling a vine crop harvester in trailing relation with and for altitudinal adjustment relative to a conventional tractor.

A further object of the invention is to provide a vine crop harvester that is relatively simple and inexpensive of manufacture, light in weight, adjustably adaptable to the conditions and variations of field operation, and efficient in the collection and elevation of vine crops with a minimum agitation thereof.

With the foregoing and other objects in view, my invention consists in the construction, arrangement and combination of elements hereinafter set forth, pointed out in my claims, and illustrated by the accompanying drawings, in which:

Figure 1 is a side elevation of a typical embodiment of the invention as constructed and arranged ready for practical use. Figure 2 is a top plan view of the showing of Figure 1. Figure 3 is a vertical section through and substantially on the longitudinal median line of the apparatus shown in the preceding views. Figure 4 is a front end elevation of the organization according to the preceding views, certain portions of the assembly being broken away to conserve space and to better disclose otherwise concealed elements. Figure 5 is a fragmentary, detail, bottom plan view of the area indicated generally by the line 5—5 of Figure 1. Figure 6 is a fragmentary, detail elevation, partly in section and on an enlarged scale, of a drive arrangement advantageously employed in the invention as illustrated.

Figure 7 is a fragmentary, detail section, on an enlarged scale, taken substantially on the indicated line 7—7 of Figure 1. Figure 8 is a fragmentary, detail plan, on an enlarged scale, taken substantially on the indicated line 8—8 of Figure 1. Figure 9 is a vertical section, on an enlarged scale, through adjusting means selectively operable to regulate the altitudinal disposition of a harvester gathering means relative to an associated tractor. Figure 10 is a fragmentary, detail section, on an enlarged scale, through conveyor belt and associated supporting elements of the illustrated assembly. Figure 11 is a fragmentary, detail elevation, on an enlarged scale, of a selectively-adjustable roller mounting advantageously utilized in the improved harvester. Figure 12 is a fragmentary, detail section, on a further enlarged scale, taken substantially on the indicated line 12—12 of Figure 11.

Certain vine crops, such as beans, are customarily harvested by gathering the vine growth with its attached pods from the field and transporting it to some more convenient location for threshing and ultimate recovery of the desired crop. Such crops, when ready for harvest, are dry and tend to shatter with loss of pods and individual seeds when handled, hence gathering of the crop through the agency of rakes and comparable implements is inefficient and uneconomic, and it is hence to the provision of an implement operable to lift and gather such crops with a minimum of said loss that the instant invention is directed.

Giving effect to the principles to the invention, an axle 15 bridging between and rollably supported by wheels 16 fixedly carries a rigid frame 17, of any desired, suitable construction, whereon side members 18 of a conveyor box are fixedly supported in spaced, parallel, opposed relation perpendicular to and across the axle 15 and at an angle to the ground level engaged by the wheels 16 such as approaches the forward ends of the members 18 to such ground level and elevates the rearward ends of said members well above such level. A roller 19 is end-journaled for rotation in and bridges perpendicularly between the lower, forward ends of the members 18, and a similar roller 20 is end-journaled in bearing blocks 21 slidably carried by and for adjustment longitudinally of the rear, elevated ends of said members 18 and bridges between the latter in spaced, parallel relation with the roller 19. Suitable means, such as threaded stems 22, connect between the blocks 21 and adjacent ends of the members 18 to adjustably position said blocks along the respective members, it being convenient to provide nuts 23 threadedly engaging the stems 22 in bearing relation against the member 18 ends as means for determining any desired adjusted position of the blocks 21. An endless conveyor belt 24, of suitable flexible material, such as fabric, engages about and extends between the rollers 19 and 20 in a width substantially closing between the members 18 along the sides of said belt, the adjustable mounting of the roller 20 facilitating maintenance of desired tension in the belt 24, and slats 25, or equivalent surface projections, are provided to outstand from the exterior surface of the belt 24 in a usual manner enhancing the capacity of said belt to retain and move material deposited thereon. An apron 26 fixedly bridges between lower margins of the members 18 throughout the major length of and closely adjacent the belt 24 under run, the rearward end of the apron 26 being curved, as at 27, outwardly and downwardly away from the adjacent belt 24 run to provide an incline over and against which the elements 25 freely slide to engage in belt-supporting relation with the apron 26.

Forwardly adjacent and for cooperation with the lower end of the belt 24, a gathering reel consisting of a rotatable drum 28 and an eccentrically-related, tined spider 29 is revolubly supported by and extends between the member 18 forward ends in parallel relation with the roller 19. The gathering reel illustrated is, in and of itself, not a feature of the instant invention and is herein illustrated and briefly described merely as representative of analogous devices effective through rotation coincident with translation along the ground to engage with, elevate, and rearwardly deliver vine crops with minimum agitation and shattering thereof. The typical gathering reel illustrated is suitably constructed and arranged to provide for constant rotation of the drum 28 about its mounting axis, simultaneous, concentric rotation of the spider 29 about its axis eccentrically offset forwardly from the drum 28 axis, and for consequent reciprocation of the spider 29 tines or fingers through apertures in the drum 28 in such a manner as to provide a maximum tine or finger projection from said drum on the side laterally advancing toward the crop to be gathered and a minimum tine or finger projection, approximately end-flush with the drum 28 surface, where the assembly orbit most nearly approaches the adjacent belt 24 bight, whereby to condition the gathering reel for engagement with the vine crop as the assembly travels toward and against said crop and to retract the tines or fingers away from crop engagement as the vine material passes over the reel and onto the belt 24. Longitudinally along upper margins of the members 18 and fixedly related therewith, side-boards 30 uprise in outwardly and upwardly divergent relation to increase the capacity of the belt 24 and to prevent escape of material laterally from the belt whereupon it has been loaded, and forward, lower ends of the side-boards 30 merge into skirt extensions 31 which project forwardly from the member 18 lower ends past the ends of the roller 19 and gathering reel in covering relation with the journaled ends thereof.

The frame 17 includes elements 32 projected forwardly along outer sides of the boards 30 to overhang the journaled ends of the roller 19 and gathering reel, and other frame elements 33 ridge between said elements 32 in spaced parallelism with and above the axes of said reel and roller.

A yoke 34 fixedly projected in a substantially horizontal plane forwardly from the frame 17 and elements 32 below the elements 33 pivotally connects at its opposite forward corners with converging links 35 of a hitch connectible by means of a clevis coupling 36 with the hitch connection of a conventional tractor, the links 35 of the hitch hence being freely adjustable through a vertical arc into engagement with the tractor hitch, wherever the latter may be located. Spacedly parallel with and above the yoke 34, a beam 37 is fixed to the frame elements 33 on the longitudinal median line of the apparatus and is rigidly braced from the yoke 34 forward end in an extension forwardly beyond the latter. Gussets 38 fixedly and spacedly upstanding from the forward end of the beam 37 pivotally support a block 39 therebetween for swivelled engagement with an end of a threaded rod 40, and a link extension 41 hinged to the forward end of the beam 37 for relative oscillation in a vertical arc is equipped with gussets 42, similar to the gussets 38, pivotally supporting an apertured, internally-threaded block 43 wherethrough the threaded portion of said stem 40 engages in a manner to draw the blocks 39 and 43 together, with consequent elevation of the link extension 41 forward end, when the rod 40 is rotated in one direction and to separate said blocks 39 and 43, with consequent lowering of the link extension 41 forward end, when said rod is rotated in the opposite direction. The end of the extension 41 remote from the beam 37 is connected by means of a hinged link 44 with the hitch 35 near the clevis end of the latter, so that, when the hitch is coupled to a tractor, rotation of the rod 40 for variation of the spacing between the blocks 39 and 43 operates to elevate or depress, depending upon the direction of rod rotation, the end of the conveyor box carrying the gathering reel, and thereby determine operative disposition of said reel relative to the surface supporting the tractor and wheels 16 with provision for reel elevation during travel of the harvester from place to place. The rod 40 is preferably extended into convenient reach of the tractor operator and is provided with an actuating handle 45 and such universal joints and bearings as may be appropriate, thus facilitating altitudinal adjustment of the harvester gathering reel during the practical operation of the implement.

Power for operation of the gathering reel and conveyor belt 24 is derived from the tractor through the power take-off thereof and is transmitted to the improved harvester through the agency of a drive shaft 46 selectively connectible at its forward end with such power take-off in a usual manner and operatively engaging at its rearward end, through a suitable universal joint, with the power input element of a transmission unit 47 fixed to and carried by the rigid frame elements 33. Tractor power take-offs are quite commonly operable to connect with and drive the shaft 46 at an elevation well above the hitch 35, in which event it is feasible to mount the transmission on the elements 33 as shown by full lines in the drawings, but when the power take-off is at an operative elevation below that of the hitch 35, it is wholly practical to provide a mounting for the transmission 47 on relatively lower frame elements of the harvester and to engage the shaft 46 therewith beneath the hitch 35, as is indicated by broken lines in certain of the views. Whatever may be the particular mounting of the transmission 47, the output shaft 48 of said transmission engages with and to drive a shaft 49 suitably journaled in and through frame elements of the harvester in spaced parallelism with and above the axis of the roller 19 and projecting laterally at one side of the harvester assembly to support and simultaneously rotate inner and outer belt pulley 50 and 51, respectively, exteriorly adjacent the harvester. The pulley 50 operatively aligns with a pulley 52 fixed to the corresponding end of the roller 19 axis and drives said latter pulley 52 through the agency of an endless belt 53, and a sprocket on the axis of the roller 19 adjacent the pulley 52 is operatively connected by means of a chain 54 with a sprocket fixed to the axis of the drum 28, so that rotation of the shaft 49 operates through the connections specified to simultaneously rotate the roller 19 and gathering reel in the same direction and at suitably correlated speeds, rotation of the roller 19 tending to drive the conveyor belt 24 for travel of its upper run upwardly and rearwardly of the assembly while the gathering reel is rotated in a direction opposite to that of the wheels 16 as the harvester is drawn forwardly through a field crop. The pulley 51 of the shaft 49 operatively aligns with a pulley 55 on the corresponding end of the roller 20 axis and is operatively connected with said pulley 55 by means of a belt 56, so that rotation of the shaft 49 is applied to effect rotation of the roller 20 simultaneously with and in the same direction as rotation of the roller 19, the drives to the rollers 19 and 20 being so correlated as to rotate said rollers at the same speed, thereby effecting a drive of the conveyor belt 24 at both ends of its mounting. Provision for operative tensioning of the belt 53, when and as necessary, is made through the agency of an idler pulley 57 revolubly carried on a spindle 58 shiftably engaged with and adjustable fore-and-aft of appropriate harvester frame elements, said idler preferably being disposed to engage the outer face of the belt 53 and tighten the latter as the spindle 58 is shifted forwardly of the apparatus. Shiftability of the roller 20 as well as wear and maintenance considerations require means for adjustably tensioning the belt 56, for which purpose a block 59 selectively adjustable fore-and-aft of the apparatus on the appropriate element 32 supports and positions a spindle 60 to project laterally and outwardly across the orbit of said belt 56, and an idler pulley 61 revoluble on said spindle 60 is disposed to engage within the belt 56 loop and determine the belt tension as a consequence of block 59 adjustment.

Facilitating the retention of gathered crop material on the belt 24 and translation of such material from the lower and to the upper end of the conveyor position, a plurality of elongate, somewhat flexible retainer strips 62 are individually hinged in laterally-spaced relation to frame elements of the apparatus above the roller 19 and curve thence to engage with and lie along the upper run of the belt 24, said strips 62 hence defining a rearwardly-converging throat for the reception of initially-gathered crop material and providing a degree of pressure adequate to firm such material against end for travel with said belt as the latter moves upwardly and rearwardly of the unit.

The improved harvester constructed substantially as shown and described is connected to and in trailing relation with a tractor by means of the hitch 35 and the shaft 46 is then engaged in driven relation with the tractor power take-off.

As so connected, the harvester is ready for use. The tractor is driven forwardly to present the gathering reel of the harvester to a vine crop in the field and the tractor power take-off is simultaneously operated to drive the shaft 46 and the harvester elements reactive thereto. Drive of the shaft 46 operates to rotate the gathering reel which engages with, lifts, and rearwardly delivers the vine crop in the area over which it travels, and the simultaneous travel of the belt 24 is effective to receive the gathered crop from the reel and deliver it through and over the elevated rear end of the apparatus, a wheeled hopper or suitable vehicle traveling in trailing relation with the harvester being thus charged with the gathered crop. Through the agency of the rod 40, the gathering reel may be elevated or lowered to best meet operating conditions or to facilitate transportation of the harvester, and the adjustments characteristic of the disclosure facilitate maintenance of the unit in efficient operating condition with a minimum of delay.

Since many changes, variations, and modifications in the specific form, construction, and arrangement of the elements shown and described may be had without departing from the spirit of my invention, I wish to be understood as being limited solely by the scope of the appended claim, rather than by any details of the illustrative showing and foregoing description.

I claim as my invention:

In a vine crop harvester having an inclined endless belt type conveyor operatively mounted in a frame wheel-supported for translation with the conveyor lower end advanced in the direction of travel and for oscillation in a vertical plane about the supporting wheel axis, a gathering reel operatively paralleling the conveyor lower end, and means for synchronously driving said conveyor and reel, harvester draft means selectively adjustable to regulate the angular attitude of said frame and consequent altitudinal disposition of said reel when the harvester is hitched in towed relation with a tractor, said draft means comprising a forwardly-convergent yoke hinged at its divergent ends to forward portions of said frame for oscillation in a vertical arc, a hitch coupling on the forwardly-projected apex of said yoke, a frame-fixed beam spacedly overhanging the longitudinal median line of said yoke an extension hinged for oscillation in a vertical arc to and projecting forwardly from the forward end of said beam, a link hingedly interconnecting the forward end of said extension and a forward point on said yoke, spaced, parallel, paired gussets similarly upstanding from the beam and from said extension in alignment longitudinally of the beam, a block swivelled to and between upper ends of each gusset pair, and a manually-rotatable rod end-swivelled in the rearward of said blocks and threadedly engaging through the forward block.

JULIUS SISHC.

REFERENCES CITED

The following references are of record in the file of this patent:

UNITED STATES PATENTS

| Number | Name | Date |
|---|---|---|
| 1,345,936 | Leck | July 6, 1920 |
| 1,847,399 | Innes | Mar. 1, 1932 |
| 1,960,978 | Redpath et al. | May 29, 1934 |
| 2,195,381 | Patterson | Mar. 26, 1940 |
| 2,490,143 | Magee | Dec. 6, 1949 |